United States Patent [19]

Schürings et al.

[11] 4,283,197

[45] Aug. 11, 1981

[54] PROCESS FOR WHITENING POLYESTER FIBRES BY THE EXHAUST METHOD

[75] Inventors: Willy Schürings, Basel; Italo Anceschi, Muttenz; Gerhard Reinert, Allschwil, all of Switzerland

[73] Assignee: Ciba-Geigy Corporation, Ardsley, N.Y.

[21] Appl. No.: 130,949

[22] Filed: Mar. 17, 1980

[30] Foreign Application Priority Data

Mar. 29, 1979 [CH] Switzerland ........................ 2919/79

[51] Int. Cl.3 .............................................. C09K 11/06

[52] U.S. Cl. .......................................... 8/638; 8/643; 8/648; 8/675; 8/922; 252/301.21; 252/301.27; 252/301.29; 252/301.34

[58] Field of Search ................... 8/638, 648, 675, 643, 8/922; 252/301.21

[56] References Cited

U.S. PATENT DOCUMENTS

| | | | |
|---|---|---|---|
| 2,930,760 | 3/1960 | Gebhardt | 252/110 |
| 3,748,093 | 7/1973 | Gangwisch et al. | 252/89.1 |
| 3,755,201 | 8/1973 | Trimmer et al. | 252/539 |

FOREIGN PATENT DOCUMENTS

| | | |
|---|---|---|
| 863626 | 5/1978 | Belgium . |
| 2147130 | 3/1973 | France . |
| 2394637 | 1/1979 | France . |
| 73/42274 | 12/1973 | Japan . |

*Primary Examiner*—A. Lionel Clingman
*Attorney, Agent, or Firm*—Edward McC. Roberts

[57] ABSTRACT

A process for whitening polyester fibres with a fluorescent whitening agent for polyester and a shading dye by the exhaust method, said process being carried out in a dispersion of the fluorescent whitening agent having a pH value above 9, preferably between 11 and 13.5.

10 Claims, No Drawings

PROCESS FOR WHITENING POLYESTER FIBRES BY THE EXHAUST METHOD

The present invention relates to a novel improved process for whitening polyester fibres by the exhaust method with conventional fluorescent whitening agents for polyester in conjunction with shading dyes.

A frequently employed method in bleaching and whitening is to use violet or blue dyes concurrently in order to improve the bleaching and whitening effect. If such a dye is used in conjunction with a fluorescent whitening agent, this can serve two different purposes. On the one hand, it is possible to try to achieve an increase in the degree of whiteness by compensating for the yellow of the fabric, in which case the white shade produced by the fluorescent whitening agent on the fabric is largely retained. On the other hand, the object can be to effect with the dye in question a change in the shade of the white effect produced by the fluorescent whitening agent on the fabric, in which case too an attempt is made additionally to achieve an increase in the degree of whiteness. It is thus possible to adjust the desired shade of the white effect.

Especially interesting white effects can be obtained in this way on fabrics with high intrinsic white, on which fabrics the production of an insignificant increase in brightness (degree of whiteness) entails taking a great deal of extra trouble and care in the bleaching and/or whitening process. Small amounts of dye are used for shading, as a rule about 0.0025 to 2.5%, preferably 0.025 to 1.25%, based on the amount of fluorescent whitening agent employed. Technically, the shading of white effects obtained in continuous dyeing (e.g. by the pad-heat method) usually presents no difficulties. On the other hand, the shading of white effects e.g. with disperse dyes by the exhaust method is frequently fraught with considerable levelness problems. The shading of white effects by the exhaust method on polyester fibres using disperse dyes adapted to the fastness standard of the fluorescent whitening agent as shading dyes, has proved virtually impossible up to now. Ordinary whitening, but also the dyeing of polyester fibres by the exhaust method, is normally carried out from weakly acid to neutral baths. If a shading dye is used concurrently with the fluorescent whitening agent in this method, very unlevel white effects are obtained, as the dye deposits rapidly on the fabric, which thus is too strongly coloured in specific areas. Attempts have already been made to overcome this defect by the addition of levelling agents. But, on the one hand, it has not been possible to eliminate the problem completely, and, on the other, the necessity of using expensive levelling agents renders the process more uneconomic.

The present invention provides a novel, improved process which completely eliminates, in simple manner, the defects just referred to.

The process of the present invention for whitening polyester fibres by the exhaust method by treating said fibres in an aqueous dispersion containing one or more fluorescent whitening agents for polyester which have affinity for the substrate and are stable under the application conditions, and a small amount of a blue or violet disperse dye, or a mixture of said dyes, as shading dye, comprises carrying out the treatment in the said dispersion at a pH value above 9.

In principle, it is not necessary to set an upper limit to the pH value. Even amounts of alkali resulting in a pH value of over 14 do not impair the levelness of the whitening. An upper limit may be determined by economic considerations. The process conditions of the "peeling process" of the polyester material could for example set an upper limit to the alkalinity (e.g. at a concentration of 10-20 g/1 of NaOH).

It is preferred that the dispersion has a pH value between 11 and 14, e.g. between 11 and 13.5, especially between 11 and 12.5. The pH value is adjusted by a suitable alkaline substance, preferably an alkali metal hydroxide, especially KOH, but most preferably NaOH.

The treatment is carried out in the usual manner at a temperature between room temperature and 140° C., especially between 50° and 130° C. It is advantageous to put the material into the treatment bath at low temperature (e.g. 50° C.) and then to raise the temperature (e.g. to 120° C.).

In actual practice it is preferred to carry out the treatment under high temperature conditions in order to ensure an optimum exhaustion of the fluorescent whitening agent onto the fibres, i.e. the treatment is carried out in a conventional HT dyeing machine at a temperature above 100° C., e.g. in the range between 100° and 130° C., for example at 120° C.

A further possibility of assisting the fluorescent whitening agent to exhaust onto the fibres consists in the addition of a conventional carrier to the treatment bath. If a carrier is added, it is also possible to obtain very good results at low temperatures, e.g. below 100° C. However, it is also possible to carry out the treatment under HT conditions with the addition of a carrier. Suitable carriers are those ordinarily employed in dyeing, e.g. aromatic hydrocarbons, aromatic halogenated hydrocarbons, as well as esters and ethers of aromatic carboxylic acids. Preferred carriers are dichlorobenzenes and trichlorobenzenes, if desired also diphenyl, as well as mixtures of these substances.

The treatment time of the textiles in the fluorescent whitening agent dispersion can vary within wide limits, but a duration of at least 20 to 30 minutes is advantageous.

Depending on the fluorescent whitening agent (pure substance) employed in the dispersion, the amount of fluorescent whitening agent is between 0.002 and 0.5%, based on the material to be whitened.

Depending on the dye and the desired shade, the amount of shading dye (pure dye) is between about 0.0025 and 2.5%, preferably between 0.025 and 1.25%, based on the amount of fluorescent whitening agent (pure substance).

The fluorescent whitening agents employed are those which are commonly applied in actual practice together with shading dyes. They are usually benzoxazole, stilbene and naphthalimide fluorescent whitening agents.

Suitable benzoxazole fluorescent whitening agents are e.g. bis-benzoxazole, styryl- or stilbenylbenzoxazole types, especially compounds of the formulae

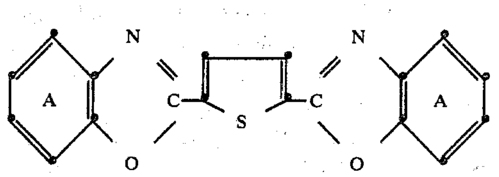 ,

-continued

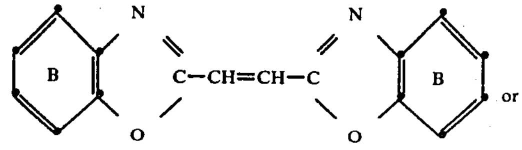

or

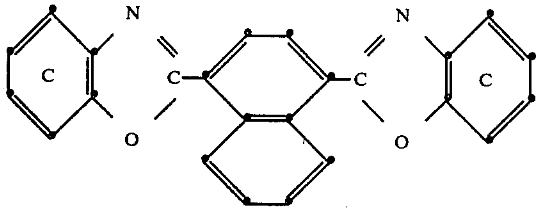

wherein the rings A, B and C can additionally contain simple radicals, such as lower alkyl or alkoxy groups or chlorine atoms, preferably 2,5-bis-benzoxazol-2-yl-thiophene, 2,5-bis-(5-methylbenzoxazol-2-yl)-ethylene and 1,4-bis-benzoxazol-2-yl-naphthalene; or compounds of the formula

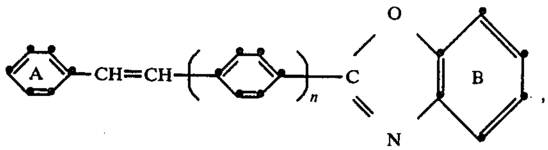

wherein n is 0 or 1 and the rings A and B can be further substituted, e.g. by alkyl, alkoxy, phenyl, chlorine, cyano, carboxyl and derivatives thereof, e.g. 4-phenyl-4'-(5-tert-butylbenzoxazol-2-yl)stilbene, 4-phenyl-4'-(5,8-dimethylbenzoxazol-2-yl)stilbene, 5,6-dimethyl-2-(4-methoxycarbonylstyryl)benzoxazole and 5,6-dimethyl-2-(4-cyanostyryl)benzoxazole.

Suitable stilbene fluorescent whitening agents are those of the formulae

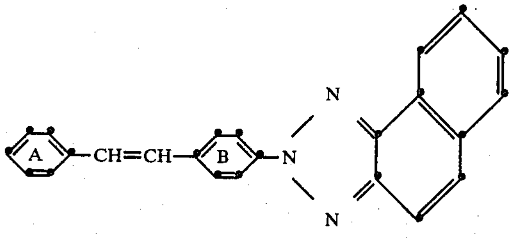

or

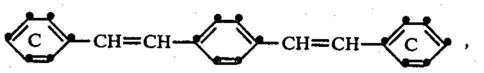

wherein the rings A, B and C can carry different substituents, e.g. alkyl, alkoxy, chlorine, cyano, carboxyl and derivatives thereof, especially 2-cyano-4-(naphtho[1,2-d]v-triazol-2-yl)-4'-chlorostilbene, 4-(naphtho[1,2-d]v-triazol-2-vl)-4'-methoxycarbonylstilbene, and also 1,4-bis(2-cyanostyryl)benzene.

Suitable naphthalimide fluorescent whitening agents are those of the formula

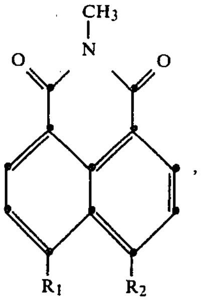

wherein $R_1$ and $R_2$ are hydrogen or alkoxy, especially those wherein $R_1$ is hydrogen and $R_2$ is methoxy, or wherein each of $R_1$ and $R_2$ is ethoxy.

The shading dyes which are used are blue or violet disperse dyes which naturally must be suitable for a treatment in an alkaline liquor. It is preferred to use acylaminoanthraquinone dyes, especially those of the formula

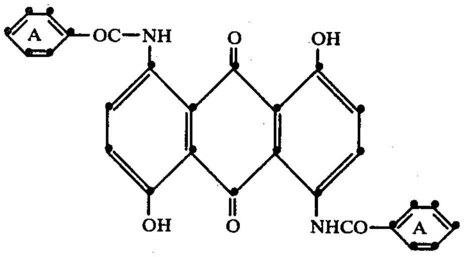

wherein the benzene rings A can be unsubstituted or substituted e.g. by alkyl, alkoxy, halogen. Especially suitable dyes are those in which the benzene rings A are unsubstituted or are substituted in the para-position by chlorine or methoxy.

In addition to containing the fluorescent whitening agent or agents and the shading dye or dyes, the aqueous dispersion advantageously also contains one or more dispersants and optionally wetting agents, stabilisers and/or other conventional dyeing assistants.

Suitable dispersing agents include: alkali metal salts, especially sodium salts, of alkyl- or alkylarylsulfonic acids and alkyl- or alkylarylcarboxylic acids, alkali metal salts, especially sodium salts, of condensation products of arylsulfonic acids with formaldehyde, macromolecular substances which are suitable for liquifying and dispersing, carboxylates of the polymerised maleic acid or polymerised acrylic acid type, and copolymers of maleic acid with allyl acetate. Examples of such dispersants are: sodium lauryl sulfate, sodium oleyl sulfate, diethanolamine oleyl sulfate, sodium benzylnaphthalenesulfonate, disodium di-(2-sulfo-1-naphthyl)methane, sodium m-xylenesulfonate, disodium-dodecylbenzenesulfonate, diethanolamine dodecylbenzenesulfonate, sodium diisopropylnaphthalenesulfonate, sodium di-n-butylnaphthalenesulfonate, sodium n-propyl-n-hexylnaphthalenesulfonate, sodium N-oleyl-methyltaurine, sodium salt of the condensation product of naphthalenesulfonic acid and formaldehyde, sodium sulfanilate, sodium benzenesulfonate, sodium cumenesulfonate, sodium toluenesulfonate, oxethylated resins, N-polyvinylpyrrolidone, sulfite cellulose lye (CaO-free), starch ethers and polysaccharides. Especially preferred dispersing agents are, however, water-soluble ethoxylated or propoxylated fatty alcohols and alkyl phenols as well as fatty alcohol polyglycol ethers, e.g. alkanols, alkenols having 8 to 22 carbon atoms and containing different amounts of oxyethylene or oxypropylene groups, alkyl or aryl polyglycol ethers containing up to 50 oxyethylene or oxypropylene groups, such as octyl-, nonyl- or dodecylphenol polyglycol ethers.

The individual constituents can be added separately to the treatment bath, which is already alkaline, or not until after the bath has been adjusted to the desired pH value.

It is preferred, however, to prepare a concentrated stable stock dispersion of the fluorescent whitening agent(s) and of the shading dye(s). Such dispersions contain fluorescent whitening agent and dye in the desired ratio. They are prepared by adding fluorescent whitening agent and dye, preferably together with a dispersing agent, to a small amount of water. It is advantageous to subject to this dispersion to a grinding (e.g. in a bead mill) in order to obtain particle sizes smaller than 10 μm, preferably smaller than 2 μm.

An amount of this stock dispersion (based on the desired amount of fluorescent whitening agent in the bath) can then be added to the treatment bath, which may additionally contain a dispersant and/or other assistants. After adjustment to the desired pH value, polyester fibres in the form of yarn, wovens and the like, can be treated with the dispersion in dyeing machines which are suitable for the purpose.

If a chlorite-resistant shading dye is used, the material can subsequently be bleached direct in the bath. To this end it is preferred to add sodium chlorite to the bath, then the alkaline bath is acidified and heated to about boiling temperature.

It will be understood that, in the present invention, the term "polyester fibres" also comprises polyester blends, e.g. polyester/cotton blends. The shaded whitening of such blends by the process of this invention can also advantageously be combined with whitening the cotton portion, with the bleaching (e.g. with peroxide) and/or with the different conventional finishing and improving processes (e.g. crease-resistant, wash and wear, softening and other finishes).

The following Examples illustrate the process of the present invention but imply no restriction to what is described therein.

EXAMPLE 1

(a) Preparation of a Fluorescent Whitening Agent Stock Dispersion 20 g of the fluorescent whitening agent of the formula

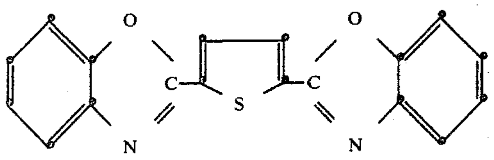

are blended with 20 mg of the violet pigment dye of the formula

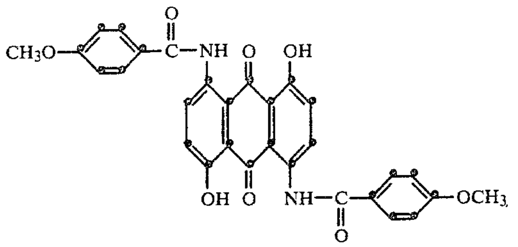

Together with 20 g of an adduct of 35 ethylene oxide groups and 4-nonylphenol the dye-fluorescent whitening agent blend is added to 40 ml of water, mixed and then ground in a bead mill for about 24 hours with 50 g of 1 mm quartz beads. The particles in the resultant dispersion have a diameter of ≦2 μm. The dispersion is separated from the quartz beads by filtration through a tightly meshed sieve and then a solution of 1 g of carboxymethyl cellulose in 19 ml of water is added. A stable dispersion is obtained.

(b) Whitening 0.4 g of the stock dispersion described in (a) and 0.2 g of a dispersing agent (adduct of 35 ethylene oxide groups and stearyl alcohol) are processed with 400 ml of water to a dispersion, which is made alkaline with 0.8 ml of 30% NaOH.

40 g of polyester staple fibre (washed and thermofixed at 180° C.) are wound evenly in the form of a web measuring about 250×12 cm on bobbin holders and treated with the above dispersion in a HT dyeing machine. The liquor has an initial pH value of 11.5. The temperature is 50° C. at the start of the treatment, then in the course of 30 minutes it is raised to 130° C. and treatment is carried out for 30 minutes at this temperature. The liquor is cooled to 70° C., then discharged, and the fabric is rinsed twice warm and dried for 5 minutes at 80° C. in a drying cabinet. The pronounced white effect (degree of whiteness) obtained on the treated material is perfectly level.

Comparison

For comparison the experiment is repeated, except that 0.2 ml of 80% acetic acid instead of 0.8 ml of 30% NaOH is added (pH of the liquor: 5.5). The whitening is carried out in this manner by the conventional method. The dried fabric has a white effect of very pronounced unlevelness and is therefore useless. The shading dye is for the most part deposited in the interior of the web of material.

EXAMPLE 2

As described in Example (1a), a suspension is prepared from 20 g of the fluorescent whitening agent of the formula

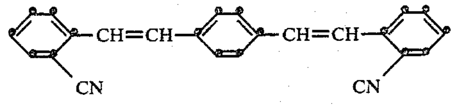

and 20 mg of the pigment dye of the formula

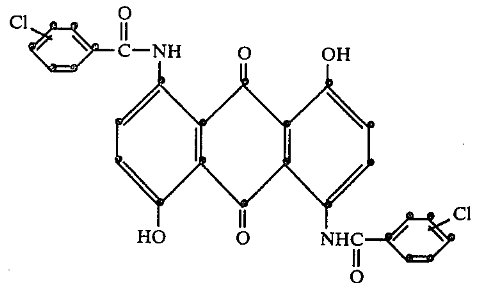

Then 0.4 g of this stock suspension are processed to a treatment liquor as described in Example (1b) (pH value about 11.5) and 40 g of polyester staple fabric are whitened with it in the manner described therein. The treated material has a pronounced white effect (degree of whiteness) of perfect levelness.

EXAMPLE 3

The procedure of Example 2 is repeated, using a fluorescent whitening agent a mixture of the two compounds of the formulae

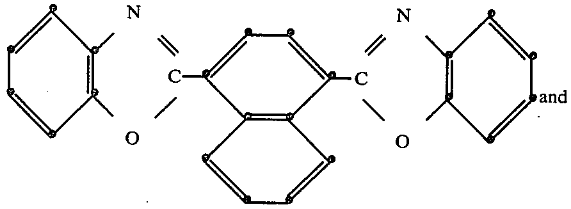

and

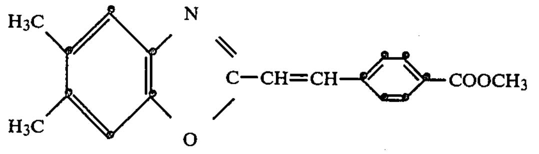

Polyester material with a pronounced white effect of perfect levelness is likewise obtained.

EXAMPLE 4

The procedure of Example 2 is repeated, using the compound of the formula

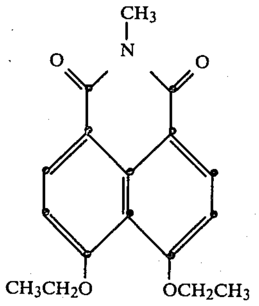

as fluorescent whitening agent for polyester. A pronounced white effect (degree of whiteness) of perfect levelness is likewise obtained on polyester.

EXAMPLE 5

0.4 g of the stock dispersion described in Example (1a) and 0.2 g of a dispersing agent (adduct of 35 ethylene oxide groups and stearyl alcohol) are processed with 400 ml of water to a dispersion, which is made alkaline with 0.8 ml of 30% NaOH.

40 g of polyester staple fibre (washed and thermofixed at 180° C.) are wound evenly in the form of a web measuring about 250×12 cm on bobbin holders and treated with the above dispersion in a HT dyeing machine. The liquor has an initial pH value of 11.5. The temperature is 50° C. at the start of the treatment, then it is raised in the course of 30 minutes to 120° C. and treatment is effected for 15 minutes at this temperature. The bath is then cooled to 70° C., 0.8 g of 80% sodium chlorite is added, and the pH is adjusted to 3–4 with 1.4 ml of 85% formic acid. The temperature is raised in the course of 20 minutes to about 100° C. and treatment is carried out for 30 minutes at this temperature. The liquor is then discharged and the material is rinsed and dried. The material is perfectly level and has a high degree of whiteness.

EXAMPLE 6

The procedure described in each of Examples 1 to 5 is repeated, replacing the respective dye by the same amount of the dye of the formula

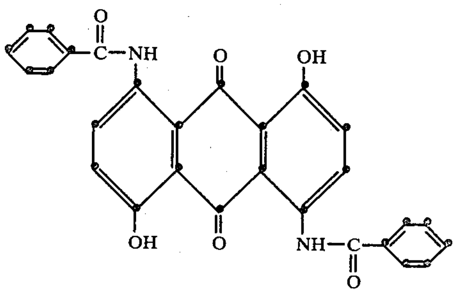

Polyester with a high degree of whiteness and of perfect levelness is obtained in each case.

What is claimed is:

1. A process for whitening polyester fibres by the exhaust method by treating said fibres in an aqueous dispersion containing one or more fluorescent whitening agents for polyester which have affinity for the substrate and are stable under the application conditions, and a small amount of a blue or violet disperse dye, or a mixture thereof, as shading dye, which process comprises carrying out the treatment in said dispersion at a pH value above 9.

2. A process according to claim 1, wherein the dispersion has a pH value between 11 and 14.

3. A process according to claim 1, wherein the shading dye is used in an amount of 0.025 to 1.25%, based on the fluorescent whitening agent employed.

4. A process according to claim 1, wherein the fluorescent whitening agent employed is a conventional benzoxazole, e.g. a bis-benzoxazole, styryl- or stilbenylbenzoxazole, a triazolyl- or styrylstilbene or a naphthalimide fluorescent whitening agent for polyester, or a mixture thereof.

5. A process according to claim 1, wherein the shading dye is a blue or violet dye of the class of the acylaminoanthraquinones.

6. A process according to claim 1, wherein the dispersion, in addition to containing the fluorescent whitening agent and the shading dye, also contains one or more conventional dispersing agents and optionally wetting agents, stabilisers and further customary dyeing assistants.

7. A process according to claim 1, which comprises adding an amount of a concentrated dispersion which contains the fluorescent whitening agent, the shading dye and a dispersant, and which has a particle size smaller than 2 $\mu m$, to a bath which contains a dispersant and has been adjusted with NaOH to the desired pH value, and treated polyester material with said bath in the conventional manner.

8. A process according to claim 1, wherein the material is subsequently also bleached in the same bath with sodium chlorite.

9. A process according to claim 1, wherein the treatment of the polyester fibres with the alkaline fluorescent whitening agent dispersion is carried out under high temperature conditions.

10. A process according to claim 1, wherein the alkaline fluorescent whitening agent dispersion contains a carrier customarily employed in dyeing.

* * * * *

UNITED STATES PATENT AND TRADEMARK OFFICE
CERTIFICATE OF CORRECTION

PATENT NO. : 4,283,197
DATED : 8/11/81
INVENTOR(S) : Willy Schurings et al

It is certified that error appears in the above—identified patent and that said Letters Patent is hereby corrected as shown below:

Claim 7, Column 9, Line 10 reads:

"value, and treated polyester material with said bath in"

Should read:

-- value, and treating polyester material with said bath in --

Signed and Sealed this

*Twenty-ninth* Day of *December 1981*

[SEAL]

*Attest:*

GERALD J. MOSSINGHOFF

*Attesting Officer* *Commissioner of Patents and Trademarks*